United States Patent [19]

Park

[11] Patent Number: 4,977,388
[45] Date of Patent: Dec. 11, 1990

[54] CONTACT PROTECTING AND ALARMING DEVICE FOR A VEHICLE

[76] Inventor: Heung Jong Park, 410-4 Beon 1-Dong, Dobong-Ku, Seoul, Rep. of Korea, 132-061

[21] Appl. No.: 291,496

[22] Filed: Dec. 29, 1988

[30] Foreign Application Priority Data

Dec. 29, 1987 [KR] Rep. of Korea ............... 23541/1987

[51] Int. Cl.⁵ .............................................. B60Q 1/00
[52] U.S. Cl. .................................. 340/436; 200/61.44
[58] Field of Search ...................... 340/436, 932.2, 665, 340/666, 940; 200/61.44, 52 R, 61.43

[56] References Cited

U.S. PATENT DOCUMENTS

| | | | |
|---|---|---|---|
| 2,557,490 | 6/1951 | Williams et al. | 200/61.44 X |
| 3,859,482 | 1/1975 | Matsui et al. | 340/436 X |
| 3,946,360 | 3/1976 | Serritella | 340/436 |
| 4,369,344 | 1/1983 | Diamond | 200/61.43 |
| 4,396,814 | 8/1983 | Miller | 200/61.43 |
| 4,677,263 | 6/1987 | Hamilton et al. | 200/61.44 |

FOREIGN PATENT DOCUMENTS 292518  1/1981  Fed. Rep. of Germany ... 340/932.2

Primary Examiner—Joseph A. Orsino
Assistant Examiner—Brian R. Tumm
Attorney, Agent, or Firm—Darby & Darby

[57] ABSTRACT

A protecting and alarming device for a vehicle which can prevent an accident caused by contact of the vehicle with another physical object as well as another car. The device absorbs the shock of contacting the object and then generates a warning sound to a driver. The device comprises an air tube, a pair of contact plates, and a fixing slot. The device is formed on or secured to a surface plate of the car body.

3 Claims, 2 Drawing Sheets

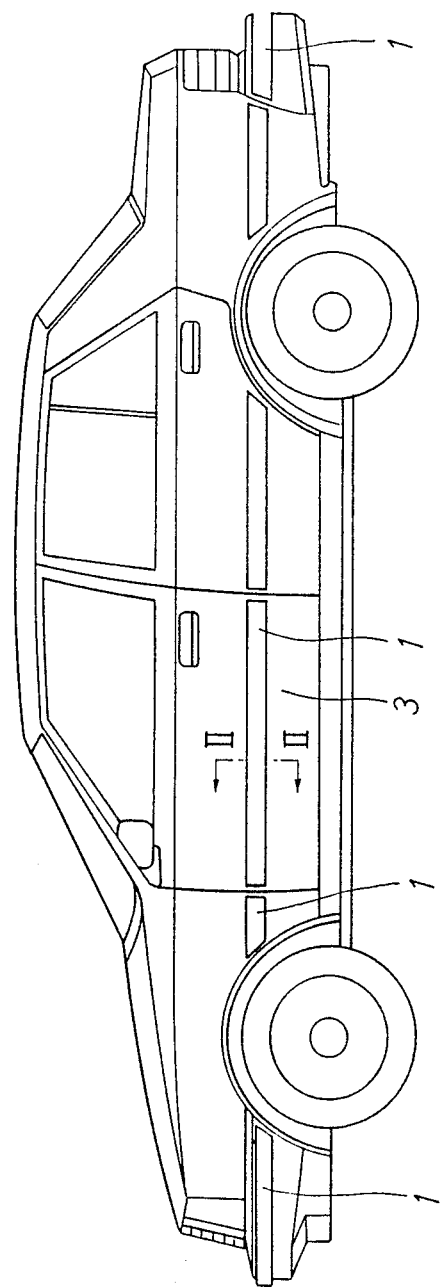

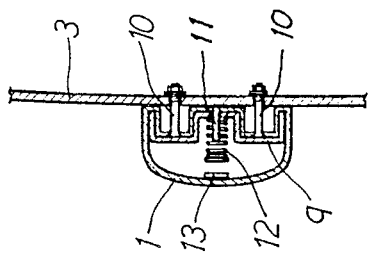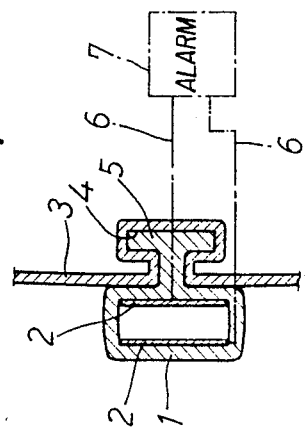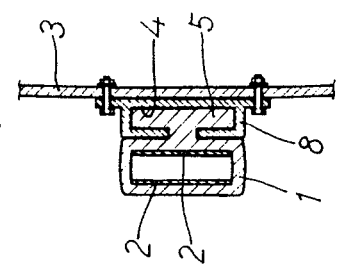

CONTACT PROTECTING AND ALARMING DEVICE FOR A VEHICLE

BACKGROUND OF THE INVENTION

The present invention relates to a contact protecting and alarming device for a vehicle, and more specifically relates to a protecting and alarming device for a vehicle in case the vehicle contacts other physical objects. The shock by the contact is absorbed and reduced by the device at the same time an alarming sound is generated so that a driver can be alerted that the vehicle is contacting other physical objects, thereby an accident due to the contact can be prevented.

Generally, in the case of a small passenger car, a simple band-shaped synthetic resin material having a predetermined thickness and width is attached along the surface plate of a car body such as the front and rear panels and approximately the central portion of the exterior of the doors. Though such a synthetic resin material enhances the external appearance of a car, it does not have sufficient strength to bear a sudden shock inflicted from the exterior. Therefore the problem exists that in the case where a car contacts an external physical object, the contact portion becomes either dented or damaged. Further, when the driver's sight is interrupted as in the case of driving of the car backwards, the car can contact an external physical object such as a wall or other car, since there has not been provided any appropriate device that can immediately inform the driver of the object. The need exists for such a device.

SUMMARY OF THE INVENTION

Therefore, an object of the present invention is to provide a protecting device to protect a car in case the car contacts an external physical object or a slight shock is inflicted, the car body can be protected by absorbing and reducing the shock.

Another object of the present invention is to provide an alarming device which in the case where a car contacts an external physical object, the driver is cautioned as the device generates a warning sound so that the car body can be protected.

A preventing and alarming device [from contacting against a vehicle]of the present invention which has such objects is attained by providing an air tube which has a predetermined width and is extended by a predetermined length by filling it with compressed air of predetermined pressure. The device includes means for fixing said air tube, a pair of contact means which electrically contact each other when said air tube is compressed due to contact with an external physical object, and an alarming device which is operable in accordance with the contact of the contact means. The contact protecting and alarming device described above is fixed to a portion of the car that can be contacted readily with an external physical object such as the front and rear bumpers, panels and the doors.

As for the air tube, like a rubber tire, a laminated fiber or the like can be generally utilized as its material, however, since considerable pressurized air is filled within the interior of the air tube, other material can widely be applied if it has a sufficient strength and flexibility to bear the pressure of air and air tightness is maintained.

The above objects and other features and advantages of the present invention will become more apparent by considering the following description which is explained in detail with reference to the accompanying drawings.

BRIEF DESCRIPTION OF THE DRAWINGS

FIG. 1 is a side view showing a car having a protecting and alarming device according to the present invention.

FIG. 2 is a sectional view taken along line II—II in FIG. 1.

FIG. 3 is a sectional view showing an embodiment of a fixing member according to the present invention.

FIG. 4 is a sectional view showing another embodiment of the fixing member according to the present invention.

DETAILED DESCRIPTION OF THE INVENTION

FIG. 1 shows the protecting and alarming device of the present invention attached to a car. The protecting and alarming device of the present invention is attached longitudinally to a portion of the car which is readily contacted with some external physical objects such as walls or other vehicles. That is, the device can be attached to the front and rear bumpers and the central portion of the front and rear side panels as well as the external surface of the doors. Thus, the present invention as shown in FIG. 2 is constructed with an air tube 1 which is substantially rectangular in shape or semicircular shape in section and is filled with air of predetermined pressure. A pair of contact plates 2, 2 is attached at both walls longitudinally, a fixing piece 5 which is T-shaped in section is attached to the back side of said air tube 1 and extends longitudinally and is inserted to the fixing slot 4 formed corresponding to it. An alarming device 7 is connected electrically by the lead wires 6, 6 to said contact plates 2, 2. Said air tube 1 should be capable of keeping the sufficient pressure resistivity and air tightness which can bear the pressure of compressed air filled in the interior thereof. Of course it should also be of sufficient toughness so as not to burst upon external contact or shock. In addition, preferably it may be a material having an elasticity that can be immediately restored to the original state if compressed by an external force. The alarming device is preferably mounted to the appropriate location of a driver's seat in such a manner that the driver is alerted when said air tube 1 is compressed by contact with an external physical object and the contact plates 2, 2 are contacted.

According to the present invention thus constructed, the air tube 1 is attached in the longitudinal direction to a portion where contact most frequently occurs with an external physical object such as the outside surface of the front and rear bumpers of a car, the central portion of the external surface of the doors, and the convexed portion and central portion of the external surface of the front and rear side panels. In the case where a car has slight contact with an external physical object, because the shock is primarily absorbed and reduced by the compressed air filled in the interior of said air tube 1, damage such as a dent in the car body due to the contact with the external physical object can be prevented.

Moreover, in case when a car is driven backward or the direction is changed within a narrow space such as a parking lot or narrow alley, even if the front or rear bumper or the like contacts the walls or adjacent vehicles, not only is the car body protected, by shock absorption but also the alarming sound is immediately generated so that the damage of a car due to the contact is prevented by calling it to a driver's attention and thereby a greater accident can be prevented.

In an embodiment of the present invention as described above, the general from of the air tube is substantially rectangular shape in section, and its fixing structure has a fixing slot 4 formed on the surface plate 3 of a car and the fixing piece 5 of the air tube 1 is inserted to said fixing slot 4 to fill it completely. Since it is formed with a fixing slot 4 to a surface plate 3 of a car, there may be a problem that a separate process for forming a fixing slot 4 can not be added to either the surface plate 3 or the front and rear bumpers etc. coming out by production in the assembly line.

Therefore, as shown in FIG. 3, a separate fixing slot at the fixing location of the surface plate of a car body is not formed while a separate fixing frame 8 capable of fixing by inserting the fixing piece 5 of said air tube 1 is formed. After inserting and fixing the fixing piece 5 of the air tube to said fixing frame 8, said fixing frame 8 can be fixed to the fixing location of the surface plate 3 etc. by utilizing the bolts and nuts or the set screws.

Furthermore, in a structure of the present invention as shown in FIG. 2 described above, in order to operate the alarming device 7 by contacting the contact plates 2, 2 attached to both internal surfaces of said air tube 1, contact is possible only when said air tube body 1 is compressed completely; that is the compressing power needs to be great due to the contact from outside. However, the structure of the contact plates 2, 2 can be modified so as to also be operated upon slight contact, as shown in FIG. 4.

FIG. 4 shows a form of the air tube, fixing structure and the structure of the contact plates that are slightly modified. As shown, the air tube is formed substantially semi-elliptical shape in section, the supporting plate 9 which the concave and convex portions are alternatively formed in cross section is fixed at the internal bottom being surrounded by the air tube 1. A number of bolts 10, 10 for fixing the air tube 1 to the surface plate 3 of the car body are attached integrally to the exterior of said supporting plate 9. A number of guide pins 11 having elasticity such as rubber material or coil springs 12 are disposed at the concaved portion of the central area of the interior of said supporting plate 9 at predetermined intervals. A band-shaped contacting plate 13 is attached longitudinally on the central interior surface of said air tube 1 at the position corresponding to said coil springs 12 so that they form the pairs of contact points together with said coil springs 12, while keeping a predetermined clearance therebetween.

Thus, in another embodiment of the present invention, when comparing with the embodiment of FIG. 2, because the distance between the contacts is closer, a warning sound is generated even if the air tube 1 has a slight contact with an external physical object.

As explained in detail hereinabove, the present invention has the effects that the damage of a car body can be prevented because in the case that a car body has light contact with an external physical object, the shock is absorbed and then reduced by the air tube of a simple structure instead of by synthetic resin of a simple structure attached to the existing vehicle. Additionally, if contact by an external force of predetermined pressure is applied, then an alarming sound is immediately generated to alert the driver so that an accident can be prevented.

I claim:

1. A protecting and alarming device for a vehicle, comprising:
   an air tube with predetermined compressed air filled in the interior thereof;
   contacting means including a pair of contact plates disposed in the longitudinal direction of both internal walls of said air tube;
   fixing means including a fixing slot and a fixing piece formed longitudinally at the back side of said air tube and being inserted within said fixing slot, said fixing slot formed on a surface plate of a car body in a manner corresponding to said fixing piece;
   and an alarming device which is connected electrically with said contact plates by lead wires.

2. A protecting and alarming device for a vehicle, comprising:
   an air tube with predetermined compressed air filled in the interior thereof;
   contacting means including a pair of contact plates disposed in the longitudinal direction of both internal walls of said air tube;
   fixing means including a fixing piece formed longitudinally at a back side of said air tube and being inserted within a fixing slot;
   said fixing means further comprises a separate fixing frame which forms said fixing slot, said fixing frame attached to a surface plate of a car body, and an alarming device electrically connected to said contact plates by lead wires.

3. A protecting and alarming device for a vehicle comprising an air tube with predetermined compressed air filled in the interior thereof, contacting means comprising a number of spaced apart coil springs which are fixed at a central portion of a supporting plate of convexed and concaved form attached to the interior of said air tube, said contacting means also comprising a contacting plate attached longitudinally on the central interior top surface of said air tube in a position corresponding to said coil springs to allow contact with said coil springs, said supporting plate secured to a surface plate of a car body, and an alarming device electrically connected to said contacting means.

* * * * *